(12) United States Patent
Ishikawa et al.

(10) Patent No.: US 6,563,989 B2
(45) Date of Patent: May 13, 2003

(54) OPTICAL FIBER COUPLER AND OPTICAL FIBER FOR OPTICAL FIBER COUPLER

(75) Inventors: Shinji Ishikawa, Yokohama (JP); Akira Urano, Yokohama (JP); Masayuki Kiya, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/964,842

(22) Filed: Sep. 28, 2001

(65) Prior Publication Data

US 2002/0041737 A1 Apr. 11, 2002

(30) Foreign Application Priority Data

Sep. 29, 2000 (JP) .................................. 2000-298258
Apr. 16, 2001 (JP) .................................. 2001-117294
Aug. 17, 2001 (JP) .................................. 2001-248280

(51) Int. Cl.⁷ .................................................. G02B 6/26
(52) U.S. Cl. ............................. 385/43; 385/24; 385/147
(58) Field of Search .......................... 385/39, 42, 43, 385/46, 48, 50, 123, 126, 127, 51, 144, 147

(56) References Cited

U.S. PATENT DOCUMENTS

| | | | | | |
|---|---|---|---|---|---|
| 4,264,126 | A | * | 4/1981 | Sheem | 264/1.25 |
| 5,179,603 | A | * | 1/1993 | Hall et al. | 385/24 |
| 5,268,979 | A | * | 12/1993 | Weidman | 385/42 |
| 5,412,745 | A | * | 5/1995 | Weidman et al. | 385/43 |
| 2002/0037132 | A1 | * | 3/2002 | Sercel et al. | 385/30 |
| 2002/0044739 | A1 | * | 4/2002 | Vahala et al. | 385/30 |

FOREIGN PATENT DOCUMENTS

JP      07-301722      11/1995

* cited by examiner

*Primary Examiner*—Akm E. Ullah
(74) *Attorney, Agent, or Firm*—McDermott, Will & Emery

(57) ABSTRACT

In a single mode optical fiber employed in an optical fiber coupler, letting r be the radial distance from the optical axis center, $\Delta n(r)$ be the relative refractive index difference at the position r within a core portion with reference to the refractive index of a cladding portion placed about the core portion, $\Delta n_{peak}$ be the peak value of the relative refractive index difference $\Delta n(r)$ at the position $r_{peak}$, and a be the core radius, the relative refractive index difference $\Delta n(r)$ satisfies the relationship of $\Delta n(r) \leq \Delta n_{peak}[1-(r/a)^3]$ in the range of $r_{peak} \leq r \leq a$; and the refractive index of the cladding portion gradually decreases outward in its radial direction.

32 Claims, 12 Drawing Sheets

US 6,563,989 B2

OPTICAL FIBER COUPLER AND OPTICAL FIBER FOR OPTICAL FIBER COUPLER

BACKGROUND OF THE INVENTION

1. Field of the Invention

The present invention relates to an optical fiber coupler which is made by arranging first and second single mode optical fibers in parallel, and elongating them upon fusion; and a single mode optical fiber for the optical fiber coupler.

2. Related Background Art

An optical fiber coupler is made by arranging first and second optical fibers in parallel and elongating them upon fusion. FIG. 17 shows a configuration thereof. In the optical fiber coupler 1 shown in FIG. 17, light inputted from a first end 11 of a first optical fiber 10 is power-split in a fusion-elongated part 30 at a splitting ratio corresponding to its wavelength, and thus split light components are outputted from a second end 12 of the first optical fiber 10 and a second end 22 of the second optical fiber 20, respectively. Here, the splitting ratio is 1:0 or 0:1 at some wavelengths. In this case, the light inputted from the first end 11 of the first optical fiber 10 is outputted from one of the second end 12 of the first optical fiber 10 and the second end 22 of the second optical fiber 20. Such an optical fiber coupler 1 is used as an optical splitter for power-splitting light inputted to one terminal and outputting thus split light components from two terminals, an optical multiplexer for multiplexing two wave length bands of light inputted to different terminals and outputting thus multiplexed light from one terminal, an optical demultiplexer for demultiplexing two wavelength bands of light inputted to one terminal and outputting thus demultiplexed light components from different terminals, or the like.

For example, the optical fiber coupler 1 is used as an optical multiplexer in an optical fiber amplifier. In this case, the optical fiber coupler 1 multiplexes the signal light (e.g., in the 1.55-$\mu$m wavelength band) to be optically amplified by an optical amplifier medium included in the optical fiber amplifier and the pumping light (e.g., at a wavelength of 0.98$\mu$m) to be supplied to the optical amplifier medium. Specifically, when the signal light to be optically amplified is inputted to the first end 11 of the first optical fiber 10 whereas the pumping light outputted from the pumping light source is inputted to the first end 21 of the second optical fiber 20, the optical fiber coupler 1 multiplexes the signal light and pumping light together and outputs thus multiplexed light from the second end 12 of the first optical fiber 10 toward the optical amplifier medium.

SUMMARY OF THE INVENTION

The inventors studied the prior art mentioned above and, as a result, have found problems as follows. Namely, it is required for such an optical fiber coupler 1 to minimize its excess loss. A case where light having a power P11 is inputted to the first end 11 of the first optical fiber 10 in the optical fiber coupler 1 will be considered. Here, it is required to minimize the excess loss represented by the following expression:

$$\text{Excess Loss (dB)} = \left| 10 \cdot \log_{10} \frac{P_{12} + P_{22}}{P_{11}} \right| \quad (1)$$

where P12 is the power of light outputted from the second end 12 of the first optical fiber 10, and P22 is the power of light outputted from the second end 22 of the second optical fiber 20.

In an ideal optical fiber coupler, as shown in FIG. 18A, the power P12 of light outputted from the second end 12 of the first optical fiber 10 and the power P22 of the light outputted from the second end 22 of the second optical fiber 20 have respective waveforms substantially symmetrical to each other to a horizontal line. Also, the total of the light powers P12 and P22 is substantially equal to the power P11 of the light inputted to the first end 11 of the first optical fiber 10, thereby hardly yielding excess loss.

However, in order to propagate both of two wavelengths of light in a single mode, the cutoff wavelength of optical fibers constituting the optical fiber coupler is set shorter than the wavelength of light on the shorter wavelength side. Therefore, the confinement of light on the longer wavelength side into the core portion becomes weaker, so that the loss of light on the longer wavelength side increases when the optical fiber is bent at a smaller radius of curvature, whereby excess loss is likely to occur. When the confinement of light into the core portion is weak, the power of light is likely to spread outside, whereby the light may partly leak to the outside due to minute variations in the outer form caused by fluctuations in the heat of a heat source (heater or burner) or the like at the time of making the optical fiber coupler. As a result, the output power may fluctuate depending on the wavelength as shown in FIG. 18B. In this case, the total of the power P12 of the light outputted from the second end 12 of the first optical fiber 10 and the power P22 of the light outputted from the second end 22 of the second optical fiber 20 becomes lower than the power P11 of the light inputted to the first end 11 of the first optical fiber 10, thereby yielding excess loss.

In order to reduce the excess loss in view of the foregoing, Japanese Patent Application Laid-Open No. HEI 7-301722, for example, discloses an optical fiber coupler made by using an optical fiber having a so-called double core type refractive index profile. Here, the double core type refractive index profile is one having, successively from the optical axis center, a first core region (with a refractive index $n_1$), a second core region (with a refractive index $n_2$), and a cladding region (with a refractive index $n_3$), wherein the refractive indices have the relationship of $n_1 > n_2 > n_3$ in terms of magnitude.

However, though the optical fiber coupler disclosed in the above-mentioned publication intends to reduce the excess loss by using an optical fiber having a double core type refractive index profile, its degree of reduction in excess loss may not be sufficient.

In order to overcome the problems mentioned above, it is an object of the present invention to provide an optical fiber coupler whose excess loss is fully reduced, and an optical fiber for the optical fiber coupler.

The present invention provides an optical fiber coupler made by arranging first and second single mode optical fibers in parallel, each operating a single mode transmission in a used all wavelength region, and elongating the first and second single mode optical fibers upon fusion; wherein each of the first and second single mode optical fibers has a cladding portion, placed about a core portion, having a refractive index gradually decreasing outward in a radial direction.

In the optical fiber coupler, since the refractive index of the cladding part of each of the first and second single mode optical fibers gradually decreases outward in the radial direction, the light spread to marginal areas of the core portion can return to the core portion without being emitted to the outside even when influenced by disturbances such as minute bending, whereby the excess loss can fully be reduced.

Also, the present invention provides an optical fiber coupler made by arranging first and second single mode optical fibers in parallel, each operating a single mode transmission in a used all wavelength region, and elongating the first and second single mode optical fibers upon fusion; wherein, in each of the first and second single mode optical fibers, letting r be the radial distance from the optical axis center, $\Delta n(r)$ be the relative refractive index difference at the position r within a core portion with reference to the refractive index of a cladding portion placed about the core portion, $\Delta n_{peak}$ be the peak value of the relative refractive index difference $\Delta n(r)$ at the position $r_{peak}$, and a be the core radius, the relative refractive index difference $\Delta n(r)$ satisfies the relationship of $\Delta n(r) \leq \Delta n_{peak}[1-(r/a)^3]$ in the range of $r_{peak} \leq r \leq a$.

In this optical fiber coupler, since the core portion of each of the first and second single mode optical fibers has such a profile, the bending loss decreases, so that the excess loss can be reduced sufficiently.

Preferably, in this optical fiber coupler, the refractive index of the cladding portion of each of the first and second single mode optical fibers gradually decreases outward in a radial direction.

In this optical fiber coupler, since the light spread to marginal areas of the core portion can return to the core portion without being emitted to the outside even when influenced by disturbances such as minute bending, the excess loss can fully be reduced.

In the optical fiber coupler in accordance with the present invention, the decrease in refractive index of the cladding portion in each of the first and second single mode optical fibers may be such that a predetermined region in the radial direction has a greater rate of decrease than that on the inner and outer sides thereof. This makes it possible for the cladding portion to be constructed by a plurality of stages.

Preferably, in the optical fiber coupler in accordance with the present invention, the difference between the average refractive index and minimum refractive index in a transverse cross section of the cladding portion is 0.02% or less in each of the first and second single mode optical fibers. This is because of the fact that, if the difference exceeds 0.02%, then a multi-mode tends to occur in the cladding portion due to its refractive index distribution, which may be converted into a higher-order mode when the single mode optical fibers are processed into the optical fiber coupler, whereby excess loss is likely to occur.

In the optical fiber coupler in accordance with the present invention, the refractive index distribution of the cladding portion in each of the first and second single mode optical fibers may be formed by a concentration distribution of at least one of chlorine atom, $GeO_2$, and OH group in $SiO_2$ glass. Alternatively, the refractive index distribution of the cladding portion may be formed by a distribution of an internal distortion imparted to the optical fiber upon drawing thereof. This makes it possible to easily realize the above-mentioned refractive index distribution of the cladding portion.

In the optical fiber coupler in accordance with the present invention, the relative refractive index difference $\Delta n(r)$ may satisfy the relationship of $\Delta n_{peak}[1-(r/a)] \leq \Delta n(r) \leq \Delta n_{peak}[1-(r/a)^{2.5}]$ in the range of $r_{peak} \leq r \leq a$. This enables each of the first and second single mode optical fibers to further reduce the bending loss, whereby the excess loss can further be lowered.

In the optical fiber coupler in accordance with the present invention, the relative refractive index difference $\Delta n(r)$ may attain the peak value $\Delta n_{peak}$ at a distance r within the range of $0 \leq r \leq a/2$. This can reduce the loss at the time of making a coupler caused by the influence of the recess at the core portion center in each fiber.

In the optical fiber coupler in accordance with the present invention, each of the first and second single mode optical fibers may have a cutoff wavelength $\lambda_c$ shorter by at least 300 nm than the longest wavelength in use. In this range, the effect of reducing the excess loss at the time of making a coupler is greater than that of conventionally known fibers having a step type refractive index distribution.

In the optical fiber coupler in accordance with the present invention, each of the first and second single mode optical fibers may have a cutoff wavelength $\lambda_c$ shorter than 980 nm. This makes it possible to form a coupler whose excess loss is lowered in a multi/demultiplexer for a wavelength of 980 nm and the band of 1500 to 1610 nm, as with an erbium-doped fiber type amplifier.

When the bending loss of each of the first and second single mode optical fibers in the wavelength band of 1.50 $\mu$m to 1.65 $\mu$m is less than 1 dB/m at a bending radius of 15 mm, the optical fiber coupler in accordance with the present invention acts more effectively. This enables the first and second single mode optical fibers to lower their respective bending losses, whereby the excess loss can fully be reduced. It is also advantageous in reducing the curvature of pigtail parts when accommodating the coupler.

The present invention provides an optical fiber for an optical fiber coupler, which is suitably usable as the optical fiber coupler in accordance with the present invention.

The present invention will become more fully understood from the detailed description given hereinbelow and the accompanying drawings. They are given by way of illustration only, and thus should not be considered limitative of the present invention.

DESCRIPTION OF THE PREFERRED EMBODIMENTS

In the following, embodiments of the present invention will be explained in detail with reference to the accompanying drawings. In the explanation of the drawings, constituents identical to each other will be referred to with numerals or letters identical to each other without repeating their overlapping descriptions.

Figure 1:
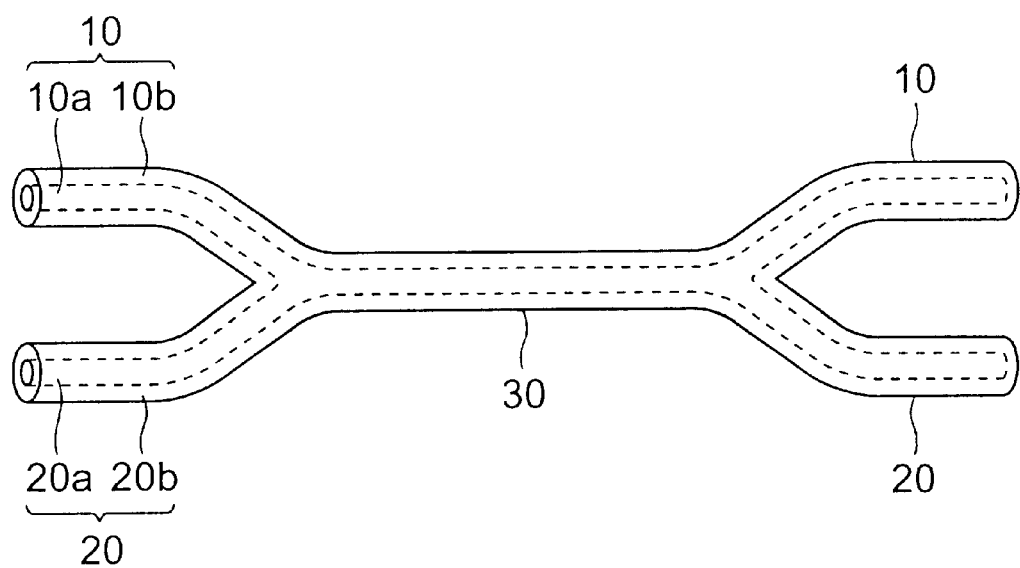
FIG. 1 is a view showing the configuration of optical fiber coupler in accordance with first to third embodiments.

To begin with, a first embodiment of the present invention will be explained. FIG. 1 is a view showing the configuration of an optical fiber coupler 1 in accordance with the first embodiment. As shown in FIG. 1, the optical fiber coupler 1 is made by arranging first and second single mode optical fibers 10, 20 in parallel, each operating a single mode transmission in a used all wavelength region, and elongating them upon fusion in a fusion-elongated part 30. The optical fibers 10, 20 constituting the optical fiber coupler 1 have core portions 10a, 20a and cladding portions 10b, 20b placed about the core portions 10a, 20a.

Figure 2:
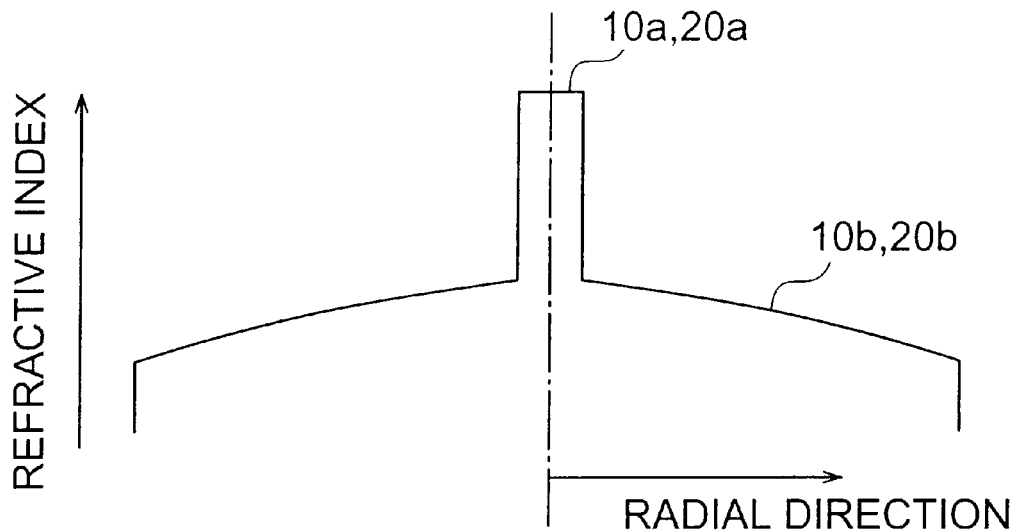
FIG. 2 is a view graph showing an example of refractive index distribution of an optical fiber used in an optical fiber coupler in accordance with the first embodiment.

FIG. 2 shows an example of refractive index distributions of the optical fibers 10, 20 employed in the optical fiber coupler 1. As shown in FIG. 2, the refractive index of the core portions 10a, 20a is higher than that of the cladding portions 10b, 20b so as to operate a single mode transmission in a used all wavelength region. The refractive index n, radius a, and wavelength λ in use of the core portions 10a, 20a, and the relative refractive index difference Δn between the core portions 10a, 20a and the inner parts of the cladding portions 10b, 20b usually have a relationship satisfying the following expression (2):

$$\pi n a (2\Delta n)^{0.5}/\lambda \leq 2.405 \quad (2)$$

Though FIG. 2 shows the refractive index of the core portions 10a, 20a as a flat constant value, it is not restricted to flat ones as long as the effective refractive index of the core portions 10a, 20a satisfies the above-mentioned expression (2). Also, the refractive index distribution of the core portions 10a, 20a may have a parabolic form whose center part is raised, or other forms.

The cladding portions 10b, 20b have a refractive index distribution in which the refractive index gradually decreases outward in the radial direction of their transverse cross sections. The relative refractive index difference between the innermost and outermost parts of the cladding portions 10b, 20b is about 0.005% to about 0.02%. Though it is not necessary for the gradient of the refractive index of the cladding portions 10b, 20b to be constant, they must be made such that there is no part in which the refractive index increases outward in the radial direction. When the gradient of the refractive index is substantially constant, the relative refractive index difference between the innermost and outermost parts of the cladding portions 10b, 20b can be set to about 0.005% to 0.02% if the ratio of gradient is about $-3 \times 10^{-4} \%/\mu m$.

Figure 3:
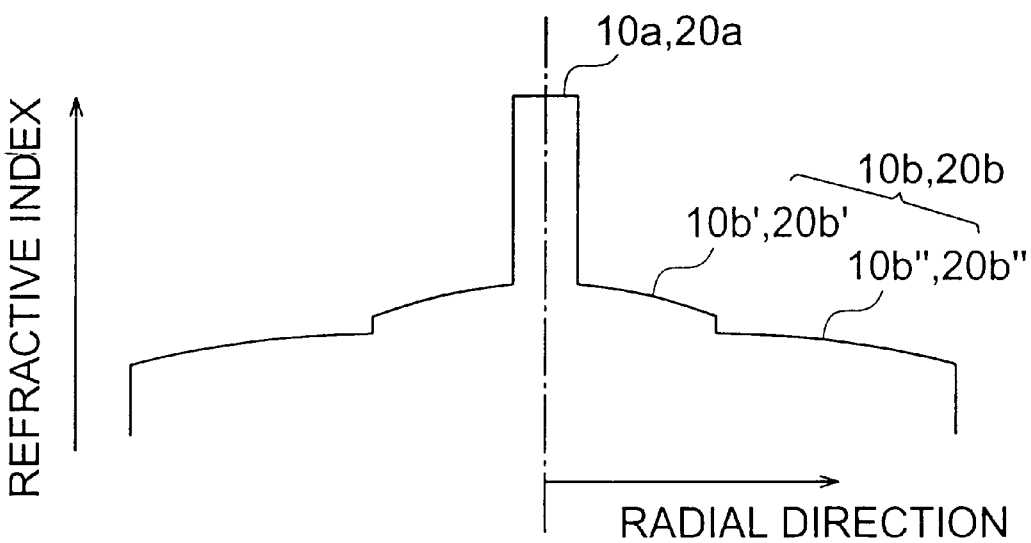
FIG. 3 is a view graph showing another example of refractive index distribution of the optical fiber used in the optical fiber coupler in accordance with the first embodiment.

FIG. 3 shows another example of refractive index distributions of the optical fibers 10, 20 used in the optical fiber coupler 1 in accordance with the first embodiment. In FIG. 3, cladding portions 10b, 20b are placed about core portions 10a, 20a, and are constituted by inner cladding portions 10b', 20b' and outer cladding portions 10b", 20b". The core portions 10a, 20a in FIG. 3 are designed as in FIG. 2 so as to operate a single mode transmission in a used all wavelength region.

Each of the refractive indices of the inner cladding portions 10b', 20b' and outer cladding portions 10b", 20b" gradually decreases outward in the radial direction of transverse cross sections of the optical fibers 10, 20. It is not always necessary for the ratio of gradient of refractive index of the inner cladding portions 10b', 20b' and that of the outer cladding portions 10b", 20b" to become identical to each other. At the boundaries between the inner cladding portions 10b', 20b' and the outer cladding portions 10b", 20b", the refractive index drastically drops at a rate greater than the rate of decrease in refractive index within the inner cladding portions 10b', 20b' and within the outer cladding portions 10b", 20b". The relative refractive index difference between the innermost part of the inner cladding portions 10b', 20b' and the outermost part of the outer cladding portions 10b", 20b" is about 0.005% to 0.02%. The outer diameter of the inner cladding portions 10b', 20b' is preferably 70 μm or less, most preferably about 30 μm to about 50 μm. The relative refractive index difference in the boundaries between the inner cladding portions 10b', 20b' and the outer cladding portions 10b", 20b" is preferably 0.007% to 0.015%.

Though FIG. 3 shows an example in which the cladding portions 10b, 20b are each divided into two stages of the inner cladding portions 10b', 20b' and outer cladding portions 10b", 20b", they may also be divided into three or more stages. In the latter case, the relative refractive index difference between the innermost and outermost parts of the cladding portions 10b, 20b is set to about 0.005% to about 0.02%. Also, there must be no part in which the refractive index gradually increases outward in the radial direction of the cladding portions 10b, 20b. The refractive index distribution in the boundaries between inner cladding portions 10b', 20b' and the outer cladding portions 10b", 20b" is not restricted to the one in which the refractive index drops discontinuously as shown in FIG. 3, but may be such that the refractive index continuously drops with a gradient greater than that within the inner cladding portions 10b', 20b' and outer cladding portions 10b", 20b".

In both of the cases of FIGS. 2 and 3, if the relative refractive index difference between the average refractive index and minimum refractive index in the transverse cross sections of the cladding portions 10b, 20b exceeds 0.02%, a multi-mode transmission tends to occur in the cladding portions 10b, 20b due to their refractive index distribution, which may be converted into a higher-order mode when the optical fibers are processed into the optical fiber coupler, whereby excess loss is likely to occur. Therefore, it is desirable that the relative refractive index difference between the average refractive index and minimum refractive index in the transverse cross sections of the cladding portions 10b, 20b be 0.02% or less.

The refractive index distribution of the cladding portions 10b, 20b can be formed by at least one of the concentration distributions of chlorine atom, $GeO_2$ (germanium dioxide), and OH group (hydroxide group) in $SiO_2$ glass. For slightly changing the refractive index, it is desirable that chlorine or a chlorine compound be added to silicon dioxide which is a main material for forming the cladding portions 10b, 20b. A preform in which the cladding portions 10b, 20b are made of silicon dioxide is treated in an atmosphere of chlorine gas or chlorine compound gas (carbon tetrachloride, silicon tetrachloride, or the like) in the temperature range of 900° C. to 1300° C. in which porous glass does not shrink, so as to dope porous glass with chlorine, and then heat-treated in an atmosphere to which neither chlorine gas nor chlorine compound gas is supplied, so as to free a part of chlorine from the surface of porous glass, whereby the amount of addition of chlorine can be lowered on the surface side of the preform.

If the bulk density of the outer peripheral part of the preform is made higher or the ratio of surface area of particles of porous glass to the mass thereof is made lower at the time of forming the preform made of porous glass, the amount of absorption and diffusion of chlorine to the glass particle surface during the chlorine atmosphere treatment is lowered, whereby the amount of addition of chlorine can be reduced at the outer peripheral part of the preform. Since the refractive index increases by about 0.1% if chlorine is added by 1 wt %, it will be sufficient if the amount of addition of chlorine is adjusted according to the desirable refractive index.

It is sufficient for the refractive index distribution of cladding portions 10b, 20b to have an amount of change as low as about 0.02%. Therefore, the cooling rate of the optical fibers 10, 20 at the time of drawing can be adjusted, so as to form a radially variable distortion within the cladding portions 10b, 20b, whereby the stress of distortion may be used so as to achieve a desirable refractive index distribution. For example, if helium gas is used as a cooling atmosphere at the time of drawing, the thermal conductivity of the gas at the time of drawing will be so high that the surface of the optical fibers 10, 20 will be cooled rapidly, which will lower the viscosity, whereby the tensile distortion is likely to remain as an internal distortion upon receiving a drawing tension. Since the refractive index decreases due to the photoelastic effect caused by the internal distortion, the cladding portion of the preform can be formed with a refractive index distribution in which the refractive index is lowered in the surface part. The refractive index distribution forming effect is more likely to occur when the drawing tension is greater.

Specific examples of the optical fiber coupler in accordance with the first embodiment will now be explained.

In Example 1, the optical fibers 10, 20 having the refractive index distribution shown in FIG. 2 was used for forming the optical fiber coupler 1. The outer diameter of the core portions 10a, 20a was 4.5 μm, the outer diameter of the cladding portions 10b, 20b was 125 μm, the relative refractive index difference between the core portions 10a, 20a and the innermost part of the cladding portions 10b, 20b was 1.1%, and the relative refractive index difference between the innermost and outermost parts of the cladding portions 10b, 20b was 0.02%. The rate of gradient of refractive index in the cladding portions 10b, 20b was $-3.3 \times 10^{-4}$%/μm on average.

In Example 2, the optical fibers 10, 20 having the refractive index distribution shown in FIG. 3 was used for forming the optical fiber coupler 1. The outer diameter of the core portions 10a, 20a was 4.5 μm, the outer diameter of the inner cladding portions 10b', 20b' was 40 μm the outer diameter of the outer cladding portions 10b", 20b" was 125 μm, the relative refractive index difference between the core portions 10a, 20a and the innermost part of the inner cladding portions 10b', 20b' was 1.1%, the relative refractive index difference between the innermost part of the inner cladding portions 10b', 20b' and the outermost part of the outer cladding portions 10b", 20b" was 0.02%, and the relative refractive index difference at the boundary parts between the inner cladding portions 10b', 20b' and the outer cladding portions 10b", 20b" was 0.008%. The rate of gradient of refractive index in each of the inner cladding portions 10b', 20b' and outer cladding portions 10b", 20b" was $-2 \times 10^{-4}$%/μm on average.

Figure 4:
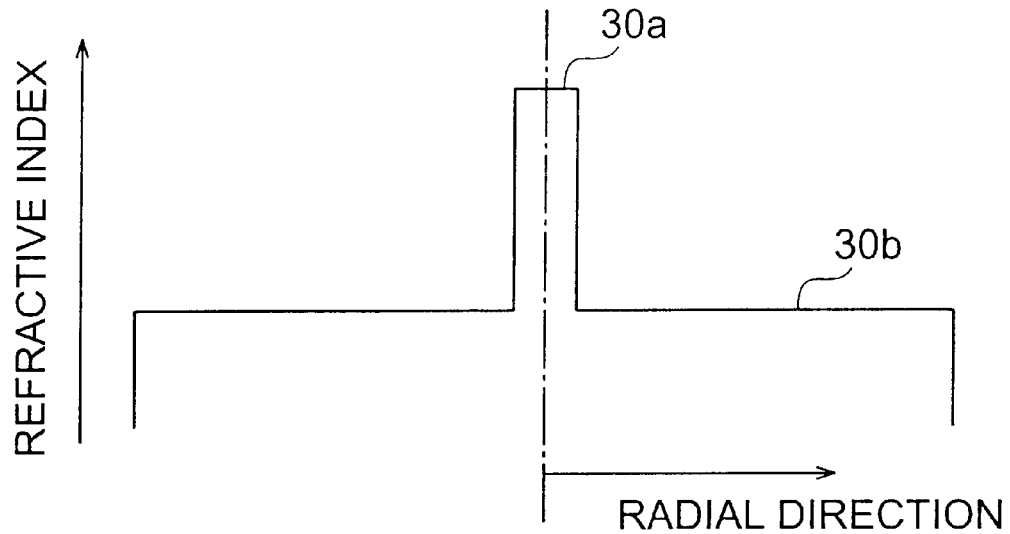
FIG. 4 is a view graph showing the refractive index distribution of an optical fiber used in the optical fiber coupler of Comparative Example 1.

In Comparative Example 1, an optical fiber having the refractive index distribution shown in FIG. 4 was used for forming an optical fiber coupler. The outer diameter of its core portion 30a was 4.5 μm the outer diameter of its cladding portion 30b was 125 μm and the relative refractive index difference between the core portion 30a and the cladding portion 30b was 1.1%. The refractive index of the cladding portion 30b was made radially constant.

Figure 5:
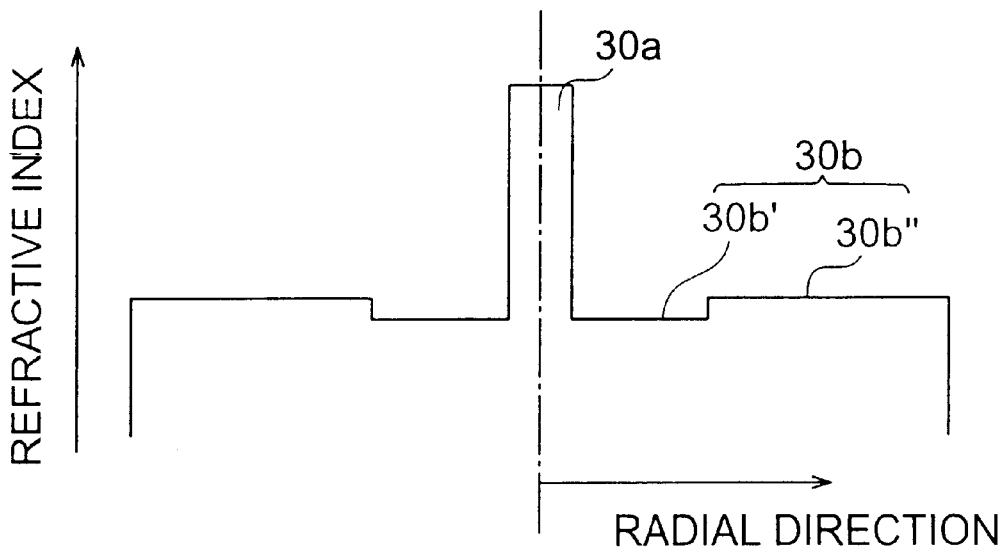
FIG. 5 is a view graph showing the refractive index distribution of an optical fiber used in the optical fiber coupler of Comparative Example 2.
Figure 6:
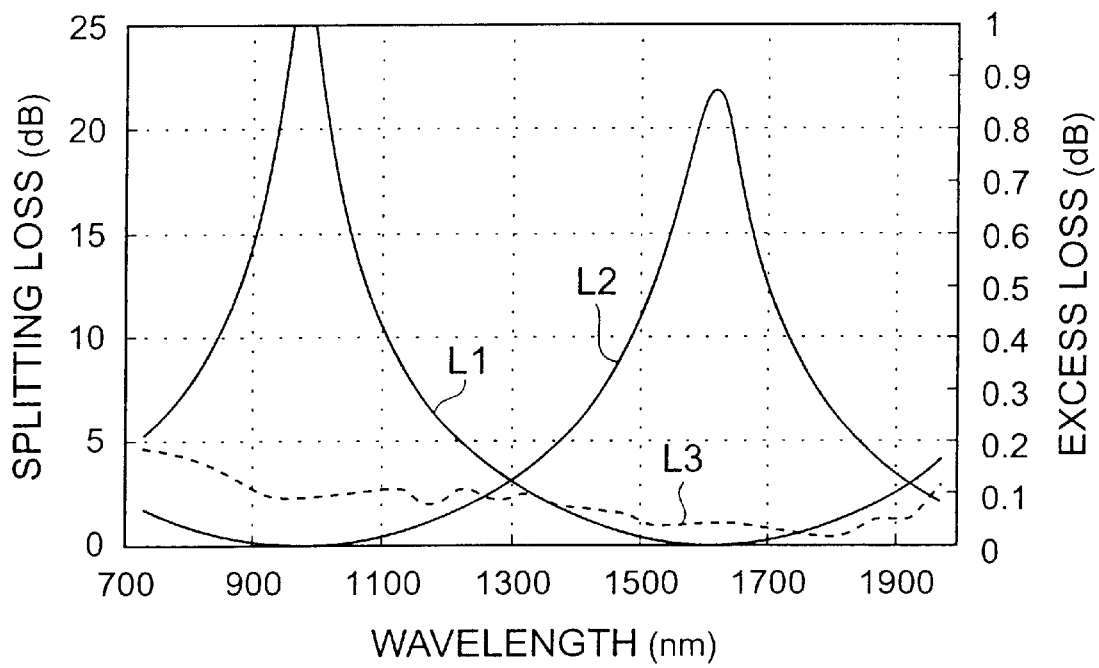
FIG. 6 is a graph showing an example of splitting loss and excess loss in the optical fiber coupler of Example 1.
Figure 7:
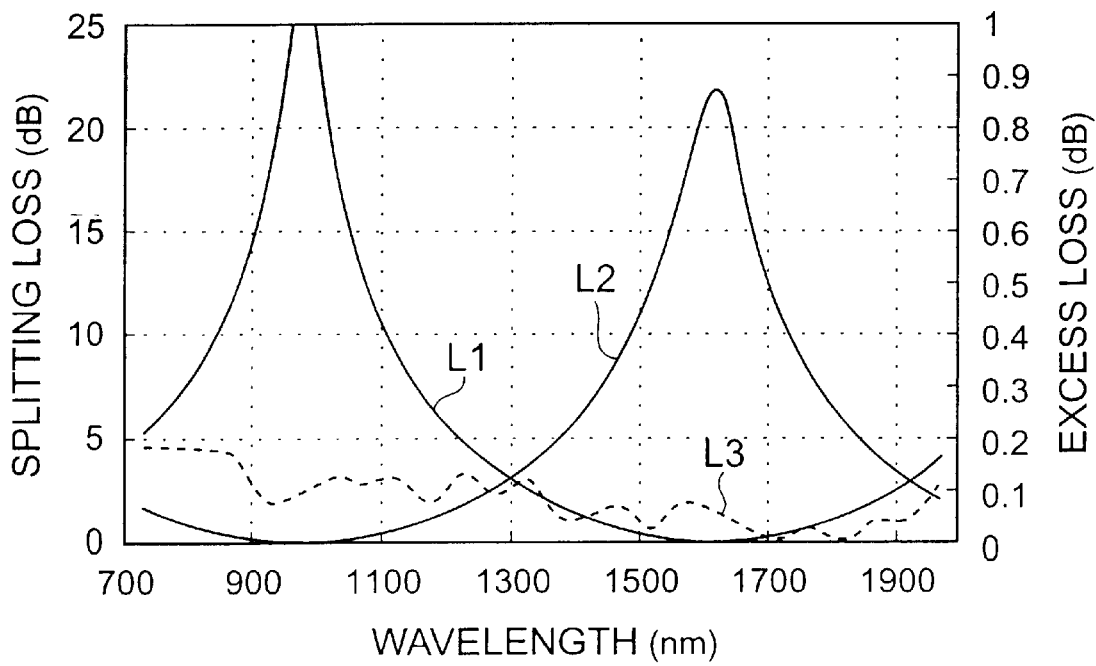
FIG. 7 is a graph showing an example of splitting loss and excess loss in the optical fiber coupler of Example 2.
Figure 8:
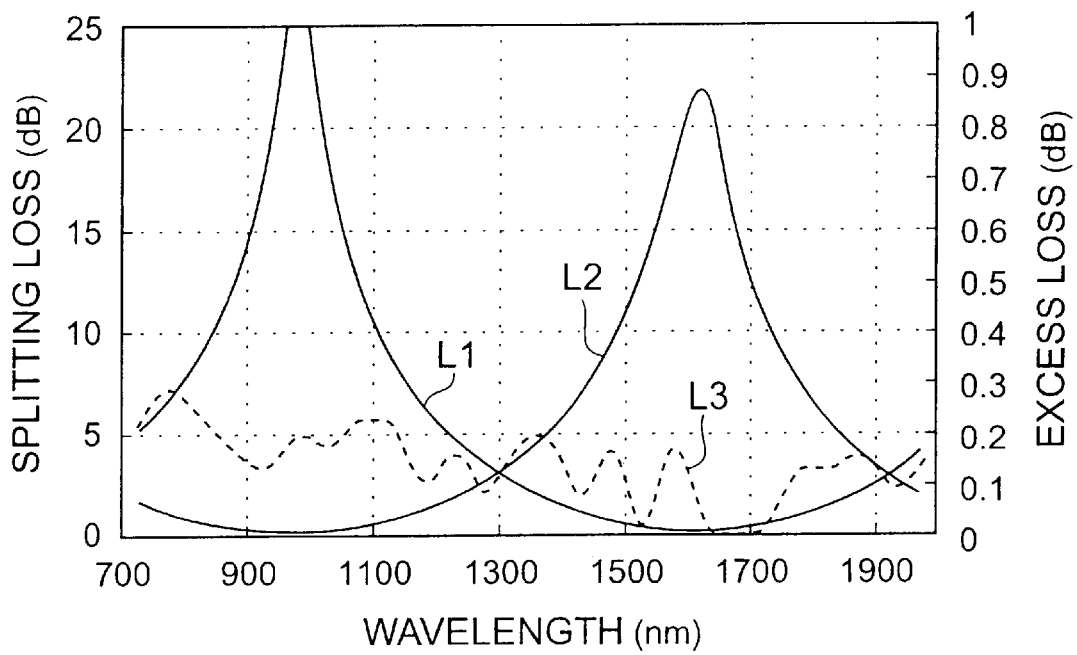
FIG. 8 is a graph showing an example of splitting loss and excess loss in the optical fiber coupler of Comparative Example 1.
Figure 9:
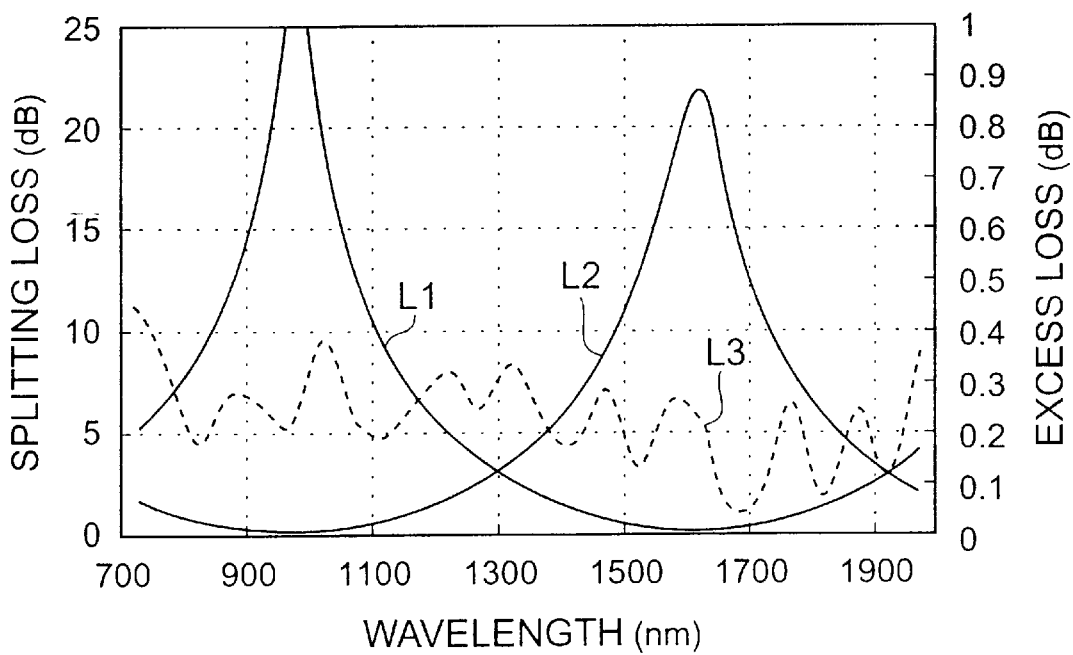
FIG. 9 is a graph showing an example of splitting loss and excess loss in the optical fiber coupler of Comparative Example 2.

In Comparative Example 2, an optical fiber having the refractive index distribution shown in FIG. 5 was used for forming an optical fiber coupler. The outer diameter of its core portion 30a was 4.5 μm, the outer diameter of its inner cladding portion 30b' was 30 μm the outer diameter of its outer cladding portion 30b" was 125 μm, and the relative refractive index difference between the core portion 30a and the cladding portion 30b was 1.1%. The refractive index of the outer cladding portion 30b" was made higher than that of the inner cladding portion 30b', so as to yield a relative refractive index difference of 0.015%.

Concerning Examples 1 and 2 and Comparative Examples 1 and 2, the splitting losses with respect to the main and branch sides and the excess loss yielded when processed into an optical fiber coupler were investigated. FIGS. 6 to 9 are graphs showing typical examples of the splitting loss on the main side (indicated by L1), the splitting loss on the branch side (indicated by L2), and the excess loss (indicated by L3) in Examples 1 and 2 and Comparative Examples 1 and 2, respectively. The left ordinate indicates the splitting losses of the branched powers on the main and branch sides with respect to the input power, whereas the right ordinate indicates the excess loss of the sum of branched powers on the main and branch sides with respect to the input power. While Examples 1 and 2 yielded an excess loss of substantially 0.1 dB or less, Comparative Examples 1 and 2 yielded a greater excess loss of 0.1 dB to 0.3 dB.

When those having an excess loss exceeding 0.1 dB in the 1.55-μm wavelength band were rejected as defective, the yields were 80%, 95%, 50%, and 10% in Examples 1 and 2 and Comparative Examples 1 and 2, respectively. From these results, it was verified that Examples exhibited excess losses lower than those in Comparative Examples.

The second embodiment of the present invention will now be explained.

Figure 10:
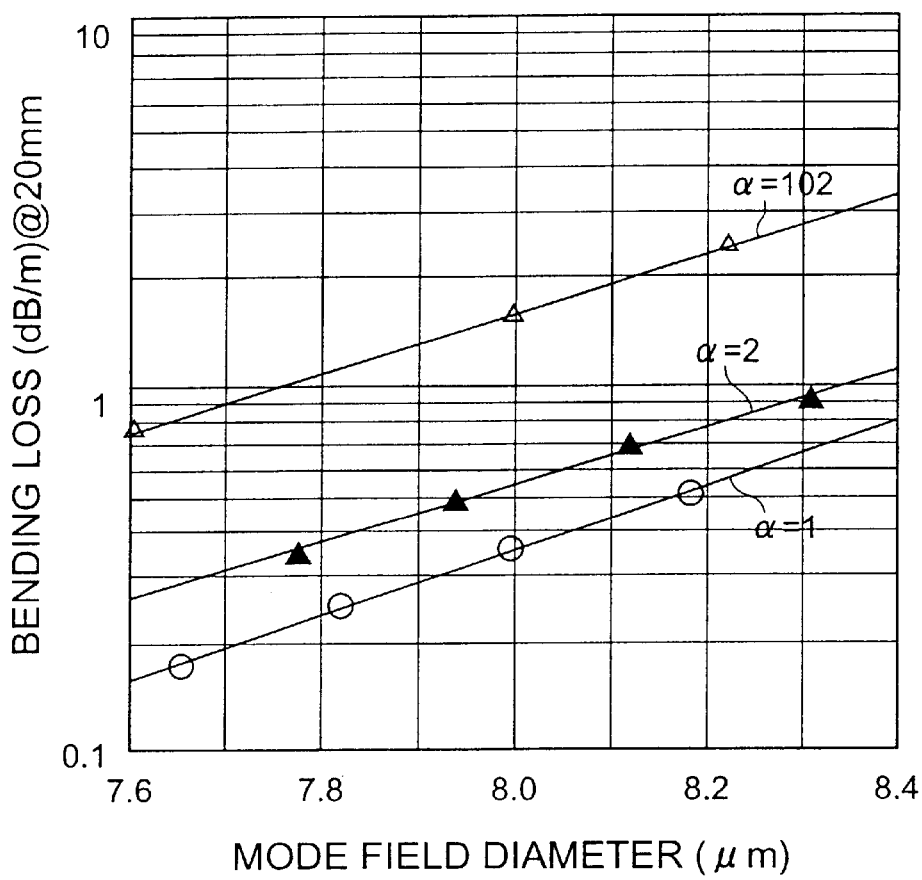
FIG. 10 is a graph showing relationships between mode field diameter and bending loss in optical fibers.

First, the background of the optical fiber coupler in accordance with the second embodiment will be explained with reference to FIGS. 10 to 13. FIG. 10 is a graph showing the relationship between the mode field diameter and bending loss in optical fibers. Three kinds of optical fiber refractive index profiles are presumed in this graph. In each optical fiber, the refractive index profile of the core portion is expressed by the α-power distribution represented by the following expression:

$$\Delta n(r) = \Delta n_{peak}\left\{1 - \left(\frac{r}{a}\right)^\alpha\right\} \quad (3)$$

where a is the core radius of the optical fiber, r is the radial distance from the optical axis center, Δn (r) is the relative refractive index difference at the position r, and $\Delta n_{peak}$ is the peak value of relative refractive index difference. The relative refractive index difference is based on the refractive index of the cladding portion. FIG. 10 shows the relationship between the mode field diameter and bending loss (at a bending diameter of 20 mm) at a wavelength of 1550 nm in each of the cases of α=1, α=2, and α=102 at a cutoff wavelength of 948 nm.

Figure 11:
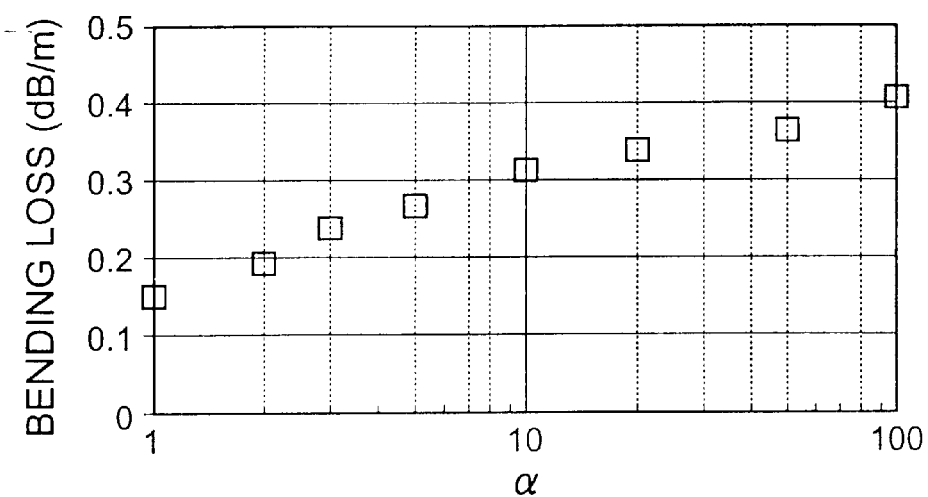
FIG. 11 is a graph showing the relationship between $\alpha$ value and bending loss in optical fibers.

FIG. 11 is a graph showing the relationship between the a value and bending loss in optical fibers. As can be seen from FIGS. 10 and 11, the bending loss of the optical fiber decreases as the mode field diameter of the optical fiber is smaller. Also, the bending loss of the optical fiber decreases as the α value of the optical fiber is smaller. This is presumed to be the fact that, when the cutoff wavelength is constant, the core diameter becomes greater as the α value is smaller, thereby enhancing the rate of light confined into the core portion.

Figure 12:
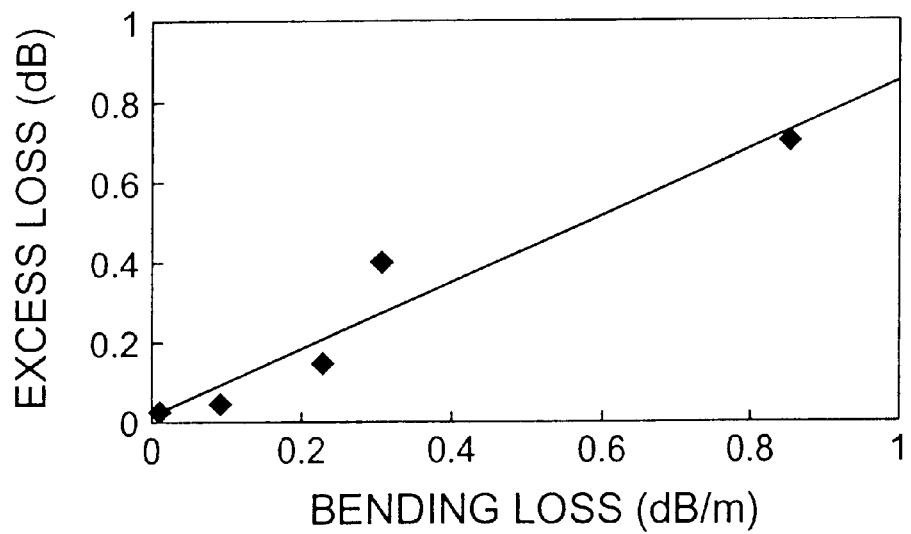
FIG. 12 is a graph showing the relationship between the bending loss of an optical fiber and the excess loss of an optical fiber coupler using the optical fiber.

FIG. 12 is a graph showing the relationship between the bending loss (at a bending diameter of 20 mm) of an optical fiber and the excess loss of an optical fiber coupler(at a wavelength of 1550 nm) using the optical fiber. As can be seen from this graph, the excess loss of the optical fiber coupler decreases as the bending loss of the optical fiber is lower. Also, from FIGS. 10 to 12, it can be seen that the excess loss of the optical fiber coupler using the optical fiber becomes lower as the a value is smaller when the cutoff wavelength is constant.

Figure 13:
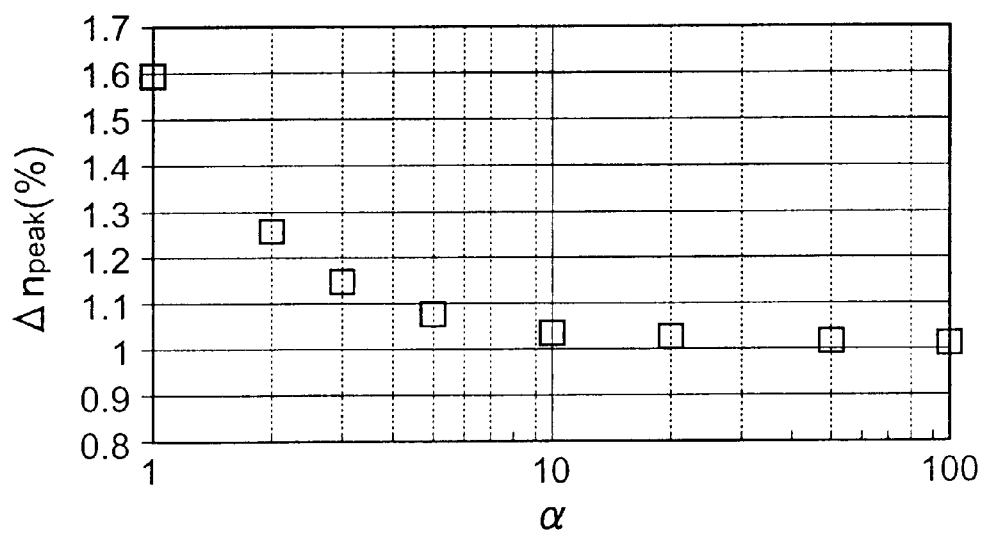
FIG. 13 is a graph showing the relationship between α value and relative refractive index difference peak value in optical fibers.

FIG. 13 is a graph showing the relationship between the ac value and relative refractive index difference peak value in optical fibers. Here, each of the mode field diameter and the cutoff wavelength is made constant. As can be seen from this graph, the relative refractive index difference peak value $\Delta n_{peak}$ becomes greater as the α value is smaller. However, it is not easy to make an optical fiber having a large relative refractive index difference peak value $\Delta n_{peak}$.

When making an optical fiber coupler from an optical fiber, the mode field diameter and cutoff wavelength of the optical fiber are appropriately designed in view of circumstances under which the optical fiber coupler is used. For reducing the excess loss, it is preferable that the a value be smaller. Namely, as for the refractive index profile of the core portion in the optical fiber used for the optical fiber coupler, one having an α value of 3 or less is preferable to a step type refractive index profile having a large α value. In particular, refractive index profiles having an α value of 1 to 2.5 is preferable. The present invention is achieved on the basis of the foregoing findings.

The optical fiber coupler in accordance with the second embodiment will now be explained. The optical fiber coupler 1 in accordance with this embodiment is made by arranging first and second single mode optical fibers 10, 20 in parallel, each operating a single mode transmission in a used all wavelength region, and elongating them upon fusion as in the one shown in FIG. 1. Each of the first optical fiber 10 and second optical fiber 20 is based on silica glass and includes core portions 10a, 20a and cladding portions 10b, 20b surrounding them, whereas the core portions 10a, 20a are doped with a refractive index raising agent (e.g., GeO$_2$) in a predetermined radial distribution.

In each of the first and second optical fibers 10, 20, letting r be the radial direction from the optical axis center, Δn(r) be the relative refractive index difference at the position r within the core portions 10a, 20a with reference to the refractive index of the cladding portions 10b, 20b, $\Delta n_{peak}$ (=$\Delta n(r_{peak})$) be the peak value of the relative refractive index difference Δn(r) at the point $r_{peak}$, and a be the core radius, the relative refractive index difference Δn(r) satisfies the relationship of $$\Delta n(r) \leq \Delta n_{peak}\left\{1 - \left(\frac{r}{a}\right)^3\right\} \quad (4)$$

within the range of $r_{peak} \leq r \leq a$. Preferably, the relative refractive index difference Δn(r) satisfies the relationship of $$\Delta n_{peak}\left\{1 - \left(\frac{r}{a}\right)\right\} \leq \Delta n(r) \leq \Delta n_{peak}\left\{1 - \left(\frac{r}{a}\right)^{2.5}\right\} \quad (5)$$

within the range of $r_{peak} \leq r \leq a$. Since such a condition is satisfied, the bending loss of the optical fibers 10, 20 is low, whereby the excess loss of the optical fiber coupler 1 is also low.

Preferably, in the optical fiber coupler 1 in accordance with the second embodiment, the bending loss of each of the first and second optical fibers 10, 20 in the wavelength band of 1.5 μm to 1.65 μm is less than 1 dB/m at a bending radius of 15 mm. As a consequence, the bending loss of each of the first and second optical fibers 10, 20 is lowered, whereby the excess loss yielded when the coupler is formed can fully be reduced.

Figure 14:
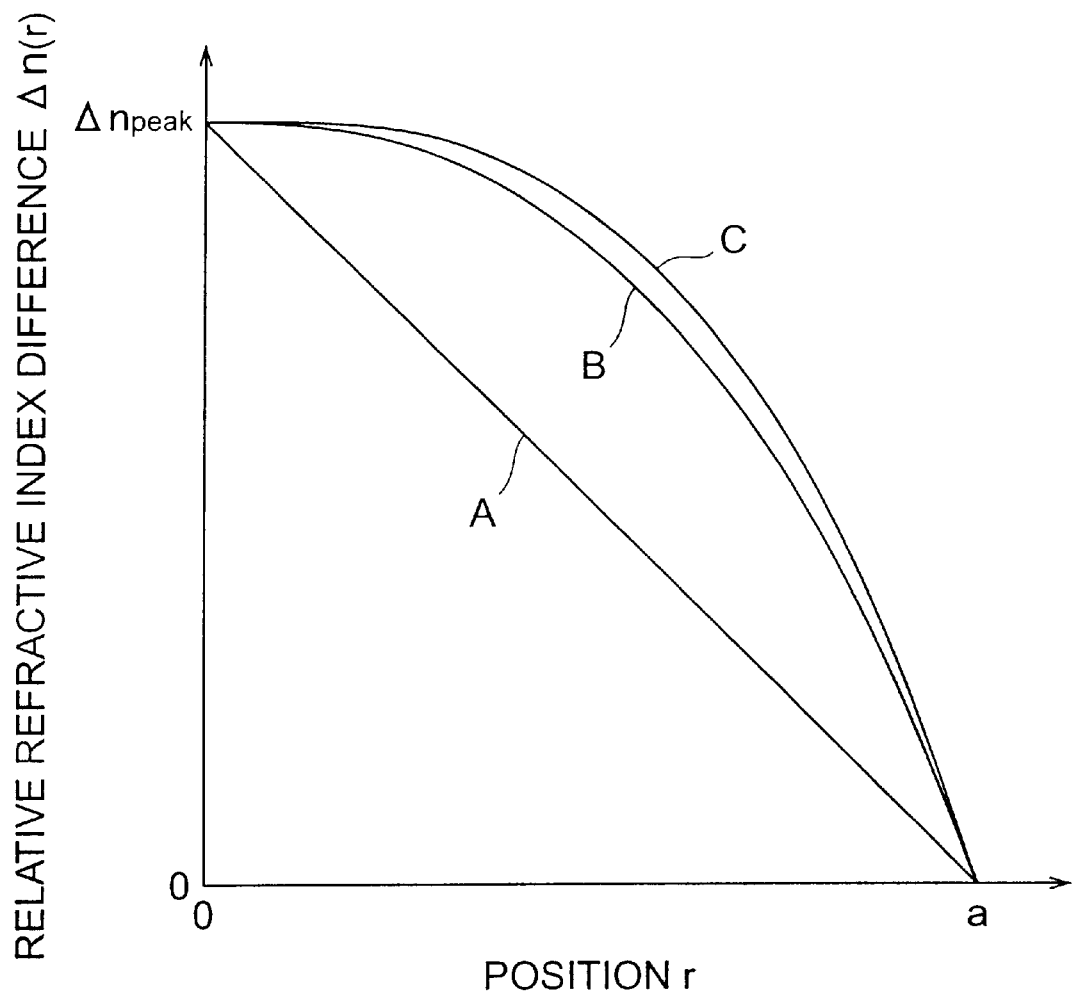
FIG. 14 is a view graph for explaining the refractive index profile of an optical fiber used in the optical fiber coupler in accordance with the second embodiment.

FIG. 14 is a view graph for explaining the refractive index profile of the optical fibers 10, 20 used in the optical fiber coupler 1 in accordance with this embodiment. This chart shows each of the line A of the above-mentioned expression (3) in the case where α=1, the curve B of the above-mentioned expression (3) in the case where α=2.5, and the curve C of the above-mentioned expression (3) in the case where α=3. Within the range of $r_{peak} \leq r \leq a$, the relative refractive index difference Δn(r) of each of the first optical fiber 10 and second optical fiber 20 is located between the line A and curve C, more preferably between the line A and curve B.

Within the range of $0 \leq r \leq r_{peak}$, the relative refractive index difference Δn(r) may be located either between the line A and curve C or not. For example, the position where the relative refractive index difference Δn(r) attains the peak value $\Delta n_{peak}$ may not be located at the optical axis center, and the relative refractive index difference Δn(0) at the optical axis center (r=0) may be lower than the peak value $\Delta n_{peak}$. However, the relative refractive index difference Δn(r) preferably attains the peak value $\Delta n_{peak}$ at a distance r within the range of $0 \leq r \leq a/2$. This can reduce the loss at the time of making a coupler caused by the influence of the recess at the core portion center in the fiber.

It is necessary for the optical fibers 10, 20 to have a cutoff wavelength $\lambda_c$ shorter than the shortest wavelength in use. Here, the excess loss yielded when a coupler is made will be reduced if the bending loss at the longest wavelength in use can be lowered. For example, when the optical fiber coupler 1 is used as an optical multiplexer in an optical amplifier for optically amplifying signal light in the 1.55 μm wavelength by using pumping light at a wavelength of 980 nm, the cutoff wavelength $\lambda_c$ of the optical fibers 10, 20 is 980 nm or less, whereas the longest wavelength in use extends to 1570 nm, thus yielding a wavelength difference as large as 590 nm. The characteristic for the bending loss appears more remarkably as the difference between the wavelength in use and the cutoff wavelength $\lambda_c$ is greater. The effect of the above-mentioned parabolic refractive index distribution of the third power or less ($\alpha \leq 3$) becomes greater when there is a wavelength difference of at least 300 nm in particular.

Figure 15:
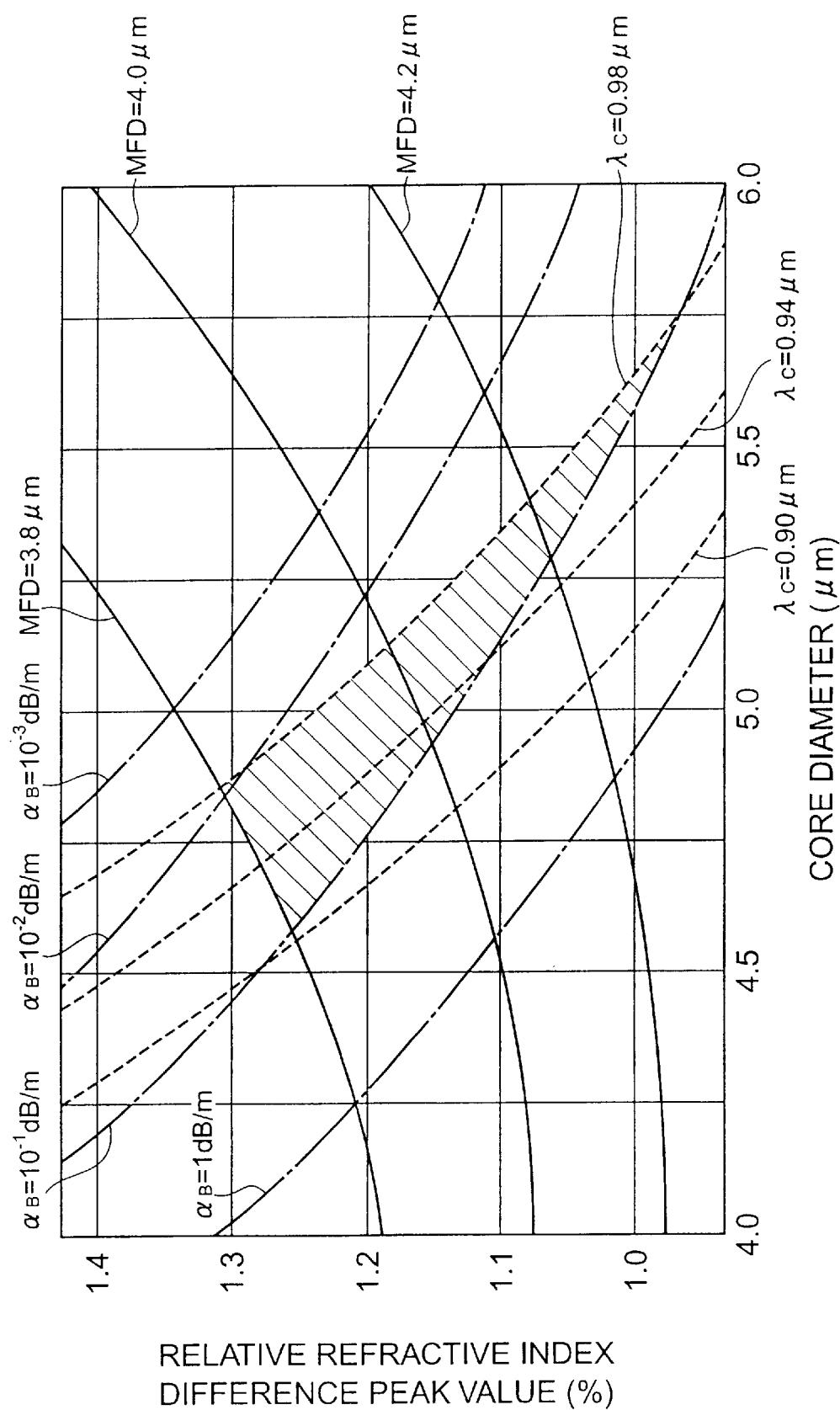
FIG. 15 is a graph for explaining how to design an optical fiber having a refractive index profile of α=2.

FIG. 15 is a graph for explaining how to design an optical fiber having a relative refractive index difference profile in which $\alpha=2$. This graph shows lines on which the cutoff wavelength $\lambda_c$ attains respective values (900 nm, 940 nm, and 980 nm), lines on which the mode field diameter MFD at a wavelength of 980 nm attains respective values (3.8 μm, 4.0 μm, and 4.2 μm), and lines on which the bending loss $\alpha_B$ at a bending diameter of 15 mm at a wavelength of 1550 nm attains respective values ($10^{-3}$ dB/m, $10^{-2}$ dB/m, $10^{-1}$ dB/m, and 1 dB/m) on a two-dimensional plane having an abscissa indicating the core diameter and an ordinate indicating the relative refractive index difference peak value. Here, the bending loss $\alpha_B$ at a bending diameter of 15 mm is about 10 times that at a bending diameter of 20 mm, whereas the bending loss of the actually manufactured optical fiber is about 10 times that of the designed optical fiber, whereby the designed bending loss $\alpha_B$ at a bending diameter of 15 mm can be considered to be on a par with the actual bending loss at a bending diameter of 20 mm.

In the case where the optical fiber coupler 1 is used as an optical multiplexer in an optical amplifier using an Er-doped optical fiber as its optical amplifier medium with pumping light having a wavelength of 980 nm, the cutoff wavelength $\lambda_c$ of the optical fibers 10, 20 used in the optical fiber coupler 1 is required to be 980 nm or shorter. It is also desirable that the bending loss $\alpha_B$ of the optical fibers 10, 20 at a wavelength of 980 nm (at the bending diameter of 15 mm) be 0.1 dB/m or less. Preferably, the mode field diameter MFD of the optical fibers 10, 20 at a wavelength of 980 nm is at least 3.8 μm but not greater than 4.6 μm. The hatched area in FIG. 15 indicates a preferred range where all of the above-mentioned conditions are satisfied.

In the area where the relative refractive index difference is 1.26% or less, as can be seen from the hatched area in FIG. 15, the upper and lower limits of the core diameter of the optical fibers 10, 20 are defined by the cutoff wavelength $\lambda_c$ and the bending loss $\alpha_B$, respectively. In the area where the relative refractive index difference is 1.26% or greater, the upper and lower limits of the core diameter of the optical fibers 10, 20 are defined by the cutoff wavelength $\lambda_c$ and the mode field diameter MFD, respectively. In the range where the relative refractive index difference is at least 1.20% but not greater than 1.26%, the core diameter is allowed to fluctuate by about ±4%. The allowance (about ±4%) for the core diameter of the optical fibers 10, 20 for the optical fiber coupler is wider than that (about ±0.5%) in typical dispersion-shifted optical fibers and dispersion-compensating optical fibers, whereby it becomes easier to make such optical fibers.

In the case of a step type refractive index profile having a large α value, there is no preferable range satisfying the above-mentioned conditions for cutoff wavelength, mode field diameter, and bending loss. When the refractive index profile of the core portions 10a, 20a of the optical fibers 10, 20 for the optical fiber coupler 1 is designed appropriately as in the foregoing, the bending loss of the optical fibers 10, 20 is lowered, and the excess loss of the optical fiber coupler 1 is reduced. Also, the optical fibers 10, 20 are easy to make and, consequently, the optical fiber coupler 1 is easy to make and excellent in yield, thereby lowering the cost of manufacture.

An example of the method of making the optical fibers 10, 20 employed in the optical fiber coupler 1 in accordance with this embodiment (rod-in-tube method) will now be explained. First, a core rod, a first cladding pipe, and a second cladding pipe are prepared. The core rod is one in which silica glass is doped with $GeO_2$, and has the above-mentioned refractive index profile, whereas $\alpha=2$ and the relative refractive index difference has a maximum value of at least 1.20% but not greater than 1.25%. Each of the first and second cladding pipes is a pipe of silica glass subjected to a chlorine dehydration treatment, and the chlorine concentration therein increases toward the inner wall thereof. In the first cladding pipe, the chlorine concentration in the vicinity of the inner wall is about 2500 ppm, for example. In the second cladding pipe, on the other hand, the chlorine concentration in the vicinity of the inner wall is about 1200 ppm, for example.

The core rod is elongated so as to yield an outer diameter of about 5.5 mm, and then its outer peripheral face is etched with an HF solution. The core rod is inserted into the first cladding pipe. They are collapsed so as to yield an outer diameter of 24 mm and extended to an outer diameter of 9.5 mm. Thereafter, its outer peripheral face is etched with the HF solution such that the outer diameter becomes 7.0 mm. The core rod and first cladding pipe after the HF solution treatment are inserted into the second cladding pipe. They are collapsed together to yield an outer diameter of 24 mm, and then are formed into an optical fiber preform by way of successive steps of extension, jacketing(depositing cladding portion), consolidating (without chlorine dehydration), and elongation. The optical fiber preform may also be made by other manufacturing methods such as VAD method.

This optical fiber preform is drawn, whereby an optical fiber is made. This optical fiber is each of the optical fibers 10, 20 employed in the above-mentioned optical fiber coupler 1 in accordance with this embodiment. The first optical fiber 10 and second optical fiber 20 are arranged in parallel and elongated upon fusion, whereby the optical fiber coupler 1 in accordance with this embodiment is made.

Figure 16A:
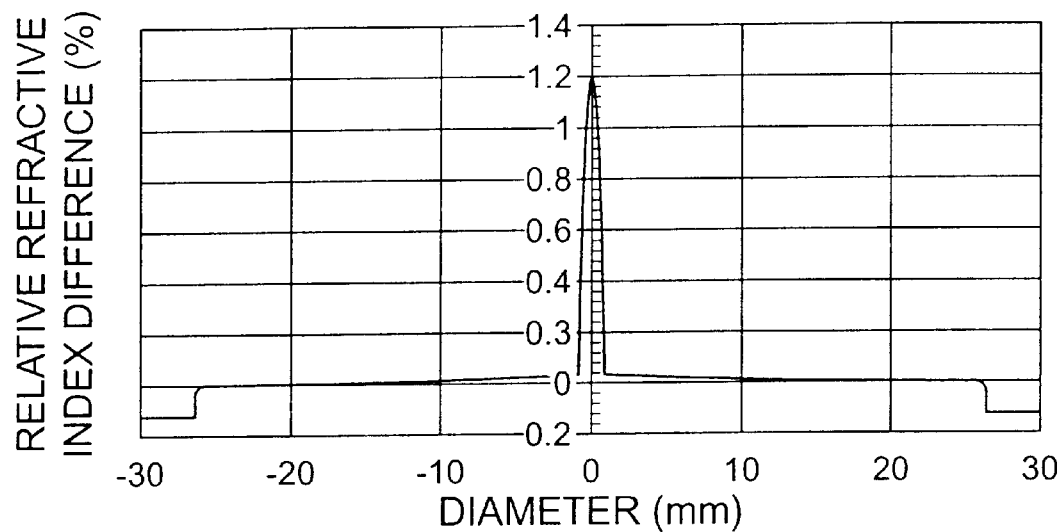
FIGS. 16A and 16B are view graphs showing the refractive index profile of an optical fiber preform.
Figure 16B:
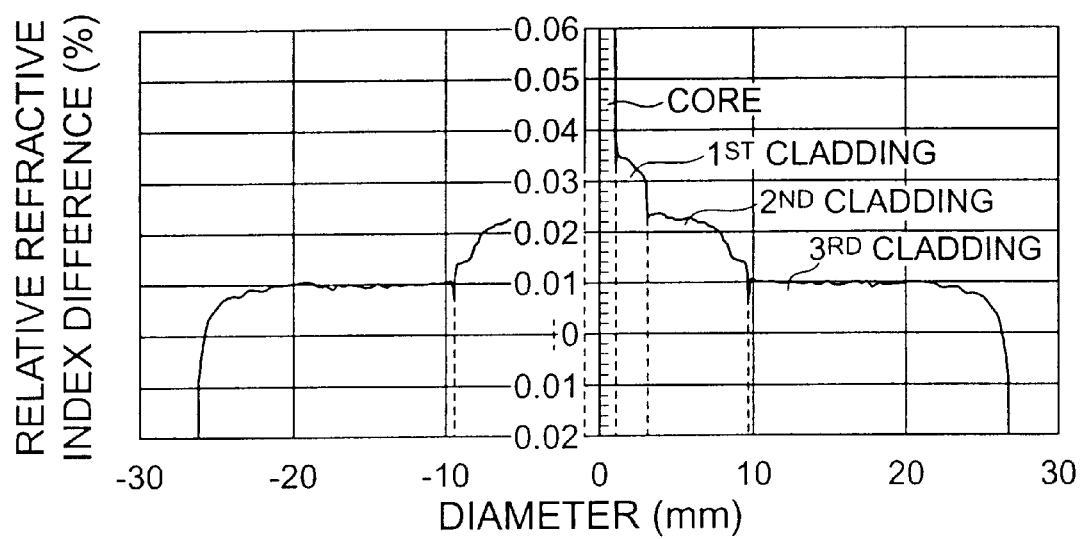
Figure 17:
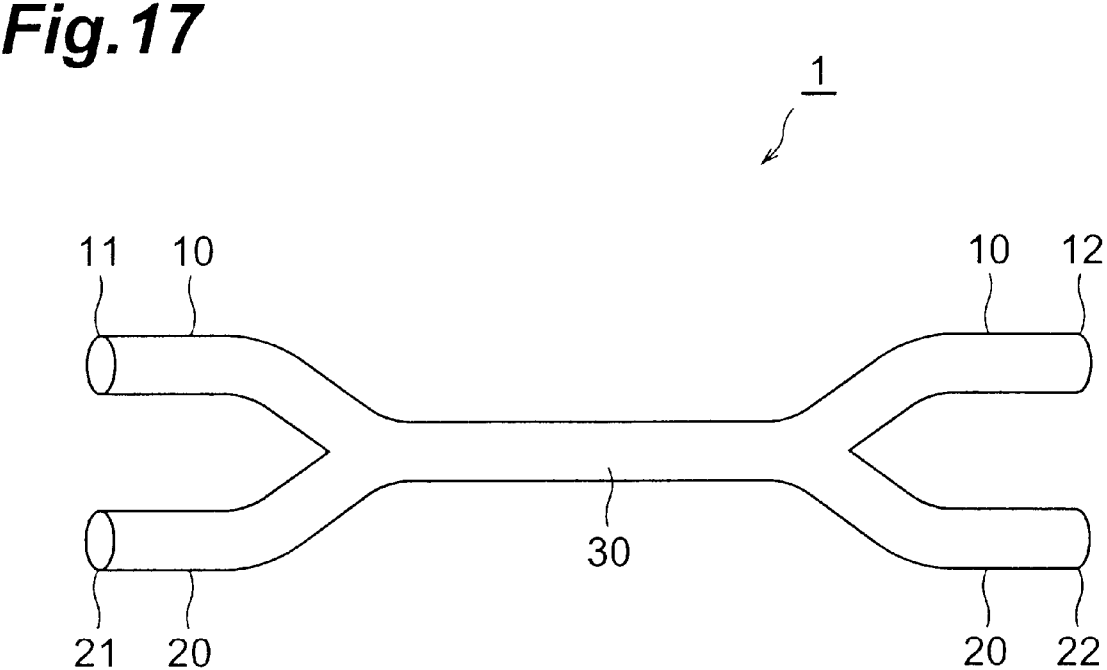
FIG. 17 is a view showing the configuration of an optical fiber for explaining excess loss.
Figure 18A:
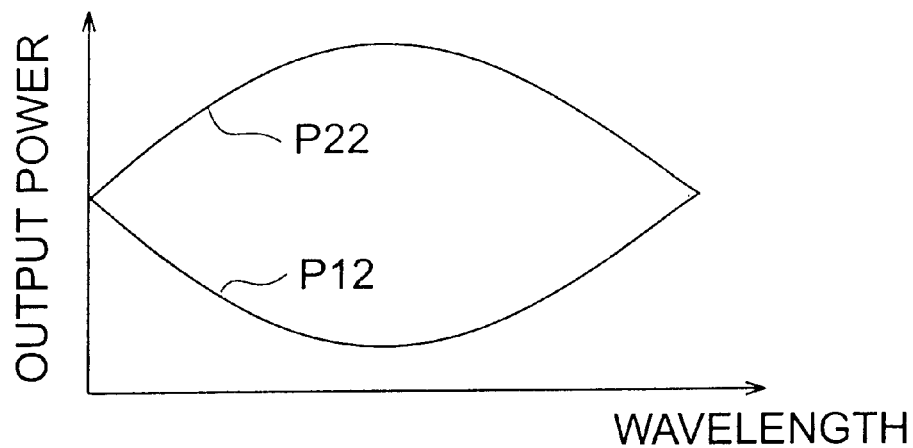
FIGS. 18A and 18B are graphs showing respective output waveforms of optical fiber couplers, illustrating examples with and without excess loss, respectively.
Figure 18B:
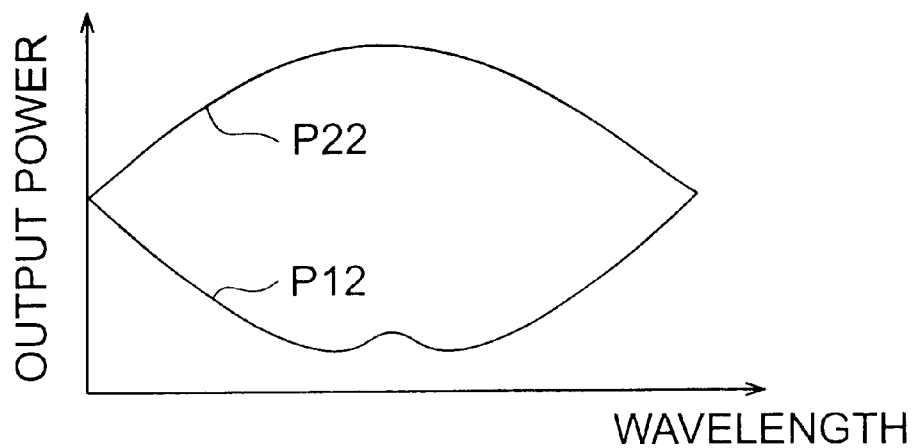

FIGS. 16A and 16B are view graphs showing the refractive index profile of thus manufactured optical fiber preform. FIG. 16B enlarges FIG. 16A in the ordinate direction. The optical fiber preform has, successively from its optical axis, a core portion, a first cladding portion, a second cladding portion, and a third cladding portion. The core portion of the optical fiber preform corresponds to the original core rod, and the core portion of the optical fiber after drawing. The first cladding portion of the optical fiber preform corresponds to the original first cladding pipe, and the first cladding portion of the optical fiber after drawing. The second cladding portion of the optical fiber preform corresponds to the original second cladding pipe, and the second cladding portion of the optical fiber after drawing. The third cladding portion of the optical fiber preform corresponds to the original jacket which is a glass particles deposit, and the third cladding portion of the optical fiber after drawing.

As can be seen from these view graphs, the refractive index distribution in the core portion is a square distribution. The refractive index distribution in the first cladding portion is such that the refractive index increases toward the optical axis center. Similarly, the refractive index distribution in the second cladding portion is such that the refractive index increases toward the optical axis center. If the first and second cladding pipes have respective chlorine concentrations on a par with each other, a depressed part having a low refractive index will be formed in a region near the interface between the first and second cladding portions. In the above-mentioned manufacturing method, however, the chlorine concentration in the second cladding pipe is sufficiently lower than that in the first cladding pipe, whereby no depressed part is formed in regions near the interface between the first and second cladding portions. Since no chlorine dehydration treatment is carried out after jacketing in the above-mentioned manufacturing method, the refractive index in the third cladding portion is a small value which is substantially constant in the radial direction. Also, since the core rod has a relatively large outer diameter, deformations of the core rod are suppressed at the time of collapsing after the core rod is inserted into the first cladding pipe, whereby bubbles (caused by $GeO_2$ in the core rod surface) are restrained from occurring in the interface between the core portion and the first cladding portion.

In the optical fiber obtained by drawing thus manufactured optical fiber preform, the cutoff wavelength was 980 nm or shorter, the mode field diameter at a wavelength of 980 nm was 3.9 μm to 4.1 μm, and the bending loss at a bending diameter of 20 mm at a wavelength of 1550 nm was 0.8 dB/m or less. In an optical fiber coupler made by using such an optical fiber, the excess loss at a wavelength of 1550 nm was about 0.01 dB, which was within the measurement error range.

The third embodiment of the present invention will now be explained.

In the first embodiment, the refractive index distribution of the cladding portions 10b, 20b of the optical fibers 10, 20 constituting the optical fiber coupler 1 is adjusted, so as to reduce the excess loss. In the second embodiment, the refractive index distribution of the core portions 10a, 20a of the optical fibers 10, 20 constituting the optical fiber coupler 1 is adjusted, so as to reduce the excess loss.

The optical fiber coupler 1 in accordance with the third embodiment includes the above-mentioned characteristics of both of the optical fiber couplers in accordance with the first and second embodiments, so that both of the refractive index distributions of the core portions 10a, 20a and cladding portions 10b, 20b of the optical fibers 10, 20 constituting the optical fiber coupler 1 are adjusted as explained in the first and second embodiments.

In the optical fiber coupler 1 in accordance with this At embodiment, since the refractive index of the cladding portion is not flat, but gradually decreases outward in the radial direction, the relative refractive index difference Δn(r) at the position r within a core portion can be provided with reference to the average refractive index of a cladding portion.

In this manner, effects similar to those of the optical fiber coupler in accordance with the first embodiment can be exhibited by adjusting the refractive index distribution of the cladding portions 10b, 20b, and effects similar to those of the optical fiber coupler in accordance with the second embodiment can be exhibited by adjusting the refractive index distribution of the core portions 10a, 20a, whereby the excess loss can further be reduced.

As explained in detail in the foregoing, the present invention provides an optical fiber coupler whose excess loss is fully reduced, and an optical fiber for the optical fiber coupler.

From the foregoing explanations of the invention, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical fiber coupler made by arranging first and second single mode optical fibers in parallel, each operating a single mode transmission in a used all wavelength region, and elongating said first and second single mode optical fibers upon fusion;

wherein, in each of said first and second single mode optical fibers, letting r be the radial distance from the optical axis center, Δn(r) be the relative refractive index difference at the position r within a core portion with reference to the refractive index of a cladding portion placed about said core portion, $\Delta n_{peak}$ be the peak value of the relative refractive index difference Δn(r) at the position $r_{peak}$, and a be the core radius, said relative refractive index difference Δn(r) satisfies the relationship of $\Delta n(r) \leq \Delta n_{peak}[1-(r/a)^3]$ in the range of $r_{peak} \leq r \leq a$.

2. An optical fiber coupler according to claim 1, wherein said relative refractive index difference Δn(r) satisfies the relationship of $\Delta n_{peak}[1-(r/a)] \leq \Delta n(r) \leq \Delta n_{peak}[1-(r/a)^{2.5}]$ in the range of $r_{peak} \leq r \leq a$.

3. An optical fiber coupler according to claim 1, wherein said relative refractive index difference Δn(r) attains said peak value $\Delta n_{peak}$ at a distance r within the range of $0 \leq r \leq a/2$.

4. An optical fiber coupler according to claim 1, wherein each of said first and second single mode optical fibers has a cutoff wavelength $\lambda_c$ shorter by at least 300 nm than the longest wavelength in use.

5. An optical fiber coupler according to claim 1, wherein each of said first and second single mode optical fibers has a cutoff wavelength $\lambda_c$ shorter than 980 nm.

6. An optical fiber coupler according to claim 1, wherein each of said first and second single mode optical fibers has a bending loss of less than 1 dB/m at a bending radius of 15 mm in the wavelength band of 1.50 μm to 1.65 μm.

7. An optical fiber coupler made by arranging first and second single mode optical fibers in parallel, each operating a single mode transmission in a used all wavelength region, and elongating said first and second single mode optical fibers upon fusion;

wherein, in each of said first and second single mode optical fibers, letting r be the radial distance from the optical axis center, Δn(r) be the relative refractive index difference at the position r within a core portion with reference to the refractive index of a cladding portion placed about said core portion, $\Delta n_{peak}$ be the peak value of the relative refractive index difference Δn(r) at the position $r_{peak}$, and a be the core radius, said relative refractive index difference Δn(r) satisfies the relationship of $\Delta n(r) \leq \Delta n_{peak}[1-(r/a)^3]$ in the range of $r_{peak} \leq r \leq a$; and wherein said cladding portion of each of said first and second single mode optical fibers has a refractive index gradually decreasing outward in a radial direction.

8. An optical fiber coupler according to claim 7, wherein said decrease in refractive index of said cladding portion in each of said first and second single mode optical fibers is such that a predetermined region in said radial direction has a greater rate of decrease than that on the inner and outer sides thereof.

9. An optical fiber coupler according to claim 7, wherein the difference between the average refractive index and minimum refractive index in a transverse cross section of said cladding portion is 0.02% or less in each of said first and second single mode optical fibers.

10. An optical fiber coupler according to claim 7, wherein, in each of said first and second single mode optical fibers, said cladding portion has a refractive index distribution formed by a concentration distribution of at least one of chlorine atom, $GeO_2$, and OH group in $SiO_2$ glass.

11. An optical fiber coupler according to claim 7, wherein said cladding portion in each of said first and second single mode optical fibers has a refractive index distribution formed by a distribution of an internal distortion imparted to said optical fiber upon drawing thereof.

12. An optical fiber coupler according to claim 7, wherein said relative refractive index difference $\Delta n(r)$ satisfies the relationship of $\Delta n_{peak}[1-(r/a)] \leq \Delta n(r) \leq \Delta n_{peak}[1-(r/a)^{2.5}]$ in the range of $r_{peak} \leq r \leq a$.

13. An optical fiber coupler according to claim 7, wherein said relative refractive index difference $\Delta n(r)$ attains said peak value $\Delta n_{peak}$ at a distance r within the range of $0 \leq r \leq a/2$.

14. An optical fiber coupler according to claim 7, wherein each of said first and second single mode optical fibers has a cutoff wavelength $\lambda_c$ shorter by at least 300 nm than the longest wavelength in use.

15. An optical fiber coupler according to claim 12, wherein each of said first and second single mode optical fibers has a cutoff wavelength $\lambda_c$ shorter than 980 nm.

16. An optical fiber coupler according to claim 7, wherein each of said first and second single mode optical fibers has a bending loss of less than 1 dB/m at a bending radius of 15 mm in the wavelength band of 1.50 μm to 1.65 μm.

17. An optical fiber for an optical fiber coupler made by arranging first and second single mode optical fibers in parallel, each operating a single mode transmission in a used all wavelength region, and elongating said first and second single mode optical fibers upon fusion;

wherein, letting r be the radial distance from the optical axis center, $\Delta n(r)$ be the relative refractive index difference at the position r within a core portion with reference to the refractive index of a cladding portion placed about said core portion, $\Delta n_{peak}$ be the peak value of the relative refractive index difference $\Delta n(r)$ at the position $r_{peak}$, and a be the core radius, said relative refractive index difference $\Delta n(r)$ satisfies the relationship of $\Delta n(r) \leq \Delta n_{peak}[1-(r/a)^3]$ in the range of $r_{peak} \leq r \leq a$.

18. An optical fiber for an optical fiber coupler according to claim 17, wherein said relative refractive index difference $\Delta n(r)$ satisfies the relationship of $\Delta n_{peak}[1-(r/a)] \leq \Delta n(r) \leq \Delta n_{peak}[1-(r/a)^{2.5}]$ in the range of $r_{peak} \leq r \leq a$.

19. An optical fiber for an optical fiber coupler according to claim 17, where in said relative refractive index difference $\Delta n(r)$ attains said peak value $\Delta n_{peak}$ at a distance r within the range of $0 \leq r \leq a/2$.

20. An optical fiber for an optical fiber coupler according to claim 17, wherein each of said first and second single mode optical fibers has a cutoff wavelength $\lambda_c$ shorter by at least 300 nm than the longest wavelength in use.

21. An optical fiber for an optical fiber coupler according to claim 17, wherein each of said first and second single mode optical fibers has a cutoff wavelength $\lambda_c$ shorter than 980 nm.

22. An optical fiber for an optical fiber coupler according to claim 17, wherein each of said first and second single mode optical fibers has a bending loss of less than 1 dB/m at a bending radius of 15 mm in the wavelength band of 1.50 μm to 1.65 μm.

23. An optical fiber for an optical fiber coupler made by arranging first and second single mode optical fibers in parallel, each operating a single mode transmission in a used all wavelength region, and elongating said first and second single mode optical fibers upon fusion;

wherein, letting r be the radial distance from the optical axis center, $\Delta n(r)$ be the relative refractive index difference at the position r within a core portion with reference to the refractive index of a cladding portion placed about said core portion, $\Delta n_{peak}$ be the peak value of the relative refractive index difference $\Delta n(r)$ at the position $r_{peak}$, and a be the core radius, said relative refractive index difference $\Delta n(r)$ satisfies the relationship of $\Delta n(r) \leq \Delta n_{peak}[1-(r/a)^3]$ in the range of $r_{peak} \leq r \leq a$; and wherein said cladding portion of each of said first and second single mode optical fibers has a refractive index gradually decreasing outward in a radial direction.

24. An optical fiber for an optical fiber coupler according to claim 23, wherein said decrease in refractive index of said cladding portion in each of said first and second single mode optical fibers is such that a predetermined region in said radial direction has a greater rate of decrease than that on the inner and outer sides thereof.

25. An optical fiber for an optical fiber coupler according to claim 23, wherein the difference between the average refractive index and minimum refractive index in a transverse cross section of said cladding portion is 0.02% or less in each of said first and second single mode optical fibers.

26. An optical fiber for an optical fiber coupler according to claim 23, wherein, in each of said first and second single mode optical fibers, said cladding portion has a refractive index distribution formed by a concentration distribution of at least one of chlorine atom, $GeO_2$, and OH group in $SiO_2$ glass.

27. An optical fiber for an optical fiber coupler according to claim 23, wherein said cladding portion in each of said first and second single mode optical fibers has a refractive index distribution formed by a distribution of an internal distortion imparted to said optical fiber upon drawing thereof.

28. An optical fiber for an optical fiber coupler according to claim 23, wherein said relative refractive index difference $\Delta n(r)$ satisfies the relationship of $\Delta n_{peak}[1-(r/a)] \leq \Delta n(r) \leq \Delta n_{peak}[1-(r/a)^{2.5}]$ in the range of $r_{peak} \leq r \leq a$.

29. An optical fiber for an optical fiber coupler according to claim 23, wherein said relative refractive index difference $\Delta n(r)$ attains said peak value $\Delta n_{peak}$ at a distance r within the range of $0 \leq r \leq a/2$.

30. An optical fiber for an optical fiber coupler according to claim 23, wherein each of said first and second single mode optical fibers has a cutoff wavelength $\lambda_c$ shorter by at least 300 nm than the longest wavelength in use.

31. An optical fiber for an optical fiber coupler according to claim 23, wherein each of said first and second single mode optical fibers has a cutoff wavelength $\lambda_c$ shorter than 980 nm.

32. An optical fiber for an optical fiber coupler according to claim 23, wherein each of said first and second single mode optical fibers has a bending loss of less than 1 dB/m at a bending radius of 15 mm in the wavelength band of 1.50 μm to 1.65 μm.

* * * * *